United States Patent [19]

Watson, Jr.

[11] 4,107,684
[45] Aug. 15, 1978

[54] PHASE LOCKED DETECTOR

[75] Inventor: Charles A. Watson, Jr., Greenville, Tex.

[73] Assignee: E-Systems, Inc., Dallas, Tex.

[21] Appl. No.: 792,931

[22] Filed: May 2, 1977

[51] Int. Cl.$^2$ .................... G01S 9/40; G01D 21/04
[52] U.S. Cl. ................................ 343/7.5; 343/12 R; 343/14; 343/5 PD; 340/552
[58] Field of Search ............. 343/5 PD, 7.7, 7.5, 343/12 R, 14 R; 340/258 A, 258 B, 3 E, 258 R; 356/5

[56] References Cited

U.S. PATENT DOCUMENTS

| Re. 27,786 | 10/1973 | Roth | 340/258 B |
|---|---|---|---|
| 3,246,322 | 4/1966 | Kuecken | 343/6 R |
| 3,649,123 | 3/1972 | Ulicki | 343/7.5 |
| 3,730,628 | 5/1973 | Wolcott et al. | 343/7.5 |
| 3,754,222 | 8/1973 | Eisenberg | 340/258 A |
| 3,973,259 | 8/1976 | Hellgren et al. | 343/12 R |
| 4,037,161 | 7/1977 | Westell | 356/5 |

Primary Examiner—Maynard R. Wilbur
Assistant Examiner—Lawrence Goodwin
Attorney, Agent, or Firm—Robert V. Wilder

[57] ABSTRACT

A microwave or ultrasonic detection system is disclosed which has a voltage controlled transmitter oscillator. The output of the transmitter oscillator is transmitted into a designated area from a transmit antenna and is reflected by objects in the area and received by means of a second antenna. The reflected signal is phase compared to the output of the transmitter oscillator. A phase error signal is generated that varies with the phase difference, and this signal is input to the transmitter oscillator to cause the frequency of the oscillator to vary in such a way to produce a null phase difference. When the position of an object which reflects the transmitted signal is changed, the length of the propagation path for the signal changes which produces a phase error signal. This phase error signal in turn causes the transmitter oscillator to shift frequency. Thus, either the output of the phase comparator or a change in the frequency of the output of the transmitter oscillator indicates a change in position of objects in the field of the transmitted signal. Range to the object is measured by phase locking at two ranges which differ by a known distance.

13 Claims, 4 Drawing Figures

PHASE LOCKED DETECTOR

BACKGROUND OF THE INVENTION

This invention relates generally to echo detection apparatus and more particularly to such a device having a variable frequency transmitter oscillator.

A number of techniques have been proposed for the detection of echo signals in a continuous wave system. A Doppler shift technique is one such technique and detects the radial motion of objects producing reflections in the field of a transmitted signal by comparing the frequency of the transmitted signal to that of the reflected signal. A frequency difference indicates the presence of a moving object in the signal field.

U.S. Pat. No. 3,863,240 to Aaron A. Galvin discloses a continuous wave system in which motion is detected by determining when the received signal level changes in phase or amplitude over a predetermined threshold.

The present invention offers advantages over the well known Doppler detection system in its ability to detect very slow motion of objects in the field of the transmitted signal and to determine the change in positions of objects from one time to a later time. This invention can also detect a radial movement and continuous movement.

SUMMARY OF THE INVENTION

In accordance with the present invention, an electromagnetic or sonic object position change detection system is provided in which the phase of a transmitter oscillator signal is locked to the phase of an object reflected signal by varying the frequency of the transmitter oscillator. The phase of the reflected signal changes in relation to the transmitted signal when the position of any object in the transmitted field is changed. This phase change is detected and the phase error difference is used to vary a control voltage that causes the transmitter oscillator to vary its frequency to regain a null phase difference. Therefore, the change in position of an object in the field of the transmitter can be determined by either monitoring the output of the phase comparison circuit or by monitoring a change in the frequency of the transmitter oscillator.

In another embodiment of the invention a carrier frequency of the transmitter is held constant and modulated by the output of a voltage controlled oscillator. The reflected signal is demodulated and phase locked to the output of the voltage controlled oscillator by varying the modulation frequency.

In another embodiment of the invention the transmitted signal is pulsed and the transmitter oscillator frequency is adjusted by a phase comparator to phase lock the transmit signal to the reflected pulse signal.

In a further embodiment of the invention the range to the object is determined by measuring the phase locked frequencies at ranges which differ by a known amount.

The present invention can be utilized in either the form of an electromagnetic system or as a sonic system.

DESCRIPTION OF THE DRAWINGS

The invention will be more fully understood from the following detailed description taken in conjunction with the accompanying drawings in which.

DETAILED DESCRIPTION OF THE INVENTION

Figure 1:
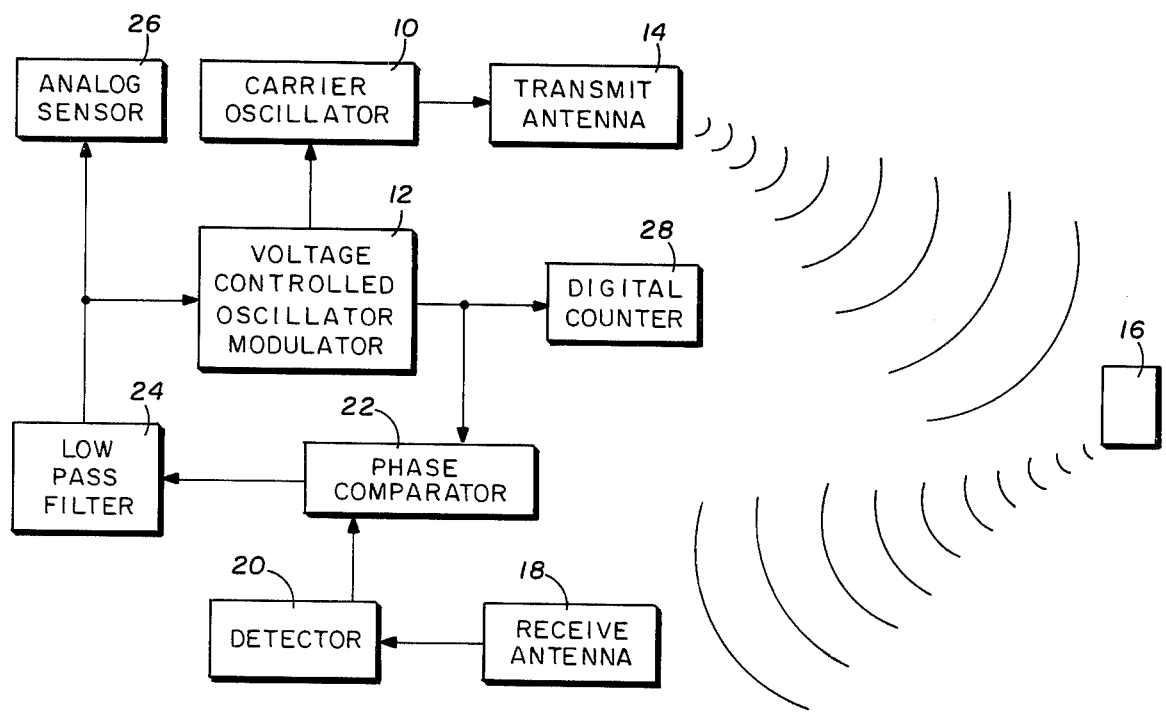
FIG. 1 is a block diagram of one embodiment of the present invention.

An intrusion detection system showing the preferred embodiment of the present invention is illustrated in FIG. 1. A voltage controlled oscillator modulator 12 provides a continuous wave modulation signal to a carrier oscillator 10. The output of the carrier oscillator 10 is provided to the transmit antenna 14 which radiates the signal into the intended zone to be protected. The output of the voltage controlled oscillator modulator 12 is also applied to a digital counter 28 and to a phase comparator 22.

A receive antenna 18 senses energy reflected from an object 16 in the field of the transmitted signal. The receive antenna 18 conveys the reflected energy to a detector 20 which provides a demodulated signal to a phase comparator 22. The phase difference between the output of the voltage controlled oscillator modulator 12 and the output of the detector 20 is measured and a control voltage signal is passed through a low pass filter 24 to the input of the voltage controlled oscillator modulator 12 and to the input of an analog sensor 26.

Referring to FIG. 1, the carrier oscillator 10 generates an electromagnetic signal which typically may be in the "X" or "K$u$" frequency bands. This microwave signal is modulated by the output of the voltage controlled modulator 12 and is then provided to the transmit antenna 14 which directs the energy into the zone of interest which is to be protected. Physical objects located within the zone of interest, such as object 16, will reflect a part of the electromagnetic energy back to the receive antenna 18. The receive antenna 18 applies the reflected energy to a detector 20 which demodulates the reflected signal and conveys the demodulated signal to an input of the phase comparator 22. Also input to the phase comparator 22 is the output signal of the voltage controlled oscillator modulator 12.

The phase comparator 22 determines the phase difference between the transmitted signal and the received signal and generates a control voltage that varies therewith. The control voltage is passed through the low pass filter 24 to eliminate any extraneous high frequency signal components and is then input to the voltage controlled oscillator modulator 12 to control the oscillation frequency.

A change in position of the object 16 is displayed by either an analog sensor 26 or a digital counter 28. The analog sensor 26 measures the amplitude of the control voltage at the output of the low pass filter 24 and any change in the output of this filter will indicate that the position of an object 16 in the field of interest has changed. Such a position change will also be indicated by a change in the frequency of the voltage controlled oscillator modulator 12 as measured by the digital counter 28.

In a steady state condition, the system establishes a frequency in which the distance from the transmit antenna 14 to the object 16 and back to the receive antenna 18 is a multiple of either the wave length or a quarter wave length of the frequency generated by the voltage controlled oscillator modulator 12. In this situation the phase difference between the transmit and receive signals is at a predetermined value and the control voltage output of the phase comparator is at a steady state level. When a movement or rearrangement of the object 16 changes the transmit antenna to receive antenna travel distance for the continuous wave output of the oscillator 12 the phase of the reflected signal is changed. This phase difference is detected by the phase comparator 22 which outputs a control voltage through the low pass filter 24 to the input of the voltage controlled oscillator modulator 12. This control voltage varies with the phase difference and alters the frequency generated by the voltage controlled oscillator modulator 12 until the new travel distance again equals a multiple of the wave length or quarter wave length of the oscillator signal. The transition to the new condition of the system is detected by both the analog sensor 26 and the digital counter 28. The analog sensor 26 will note a change in the output of the low pass filter 24 and the digital counter 28 will note a change in the output frequency of the voltage control oscillator modulator 12. Both of these output devices will indicate a change in the position of the object 16, but only one of the two need be used in any particular application.

In actual operation the zone of interest will contain a number of objects rather than the single object shown in FIG. 1. The receive antenna 18 will pick up reflections from each of the objects and each reflection signal will have the same frequency but a different phase. The demodulated reflection signal input to the phase comparator 22 will thus be a composite of all of the reflected signals and will have the transmit frequency but a composite phase. Therefore, the movement of any one of the objects in the field of interest will cause a shift in the composite phase. For example, if the system operates at X-band, with a wave length of approximately 3 centimeters, and if there is only a single object in the field there will be a one cycle frequency shift for each 3 centimeters of change in the length of the travel path from the transmit antenna 14 to the receive antenna 18. A change in position of even a small object in a field of large objects will cause a shift in the composite phase of the received signal and this shift will generate a response in both the analog and digital sensor devices.

Figure 2:
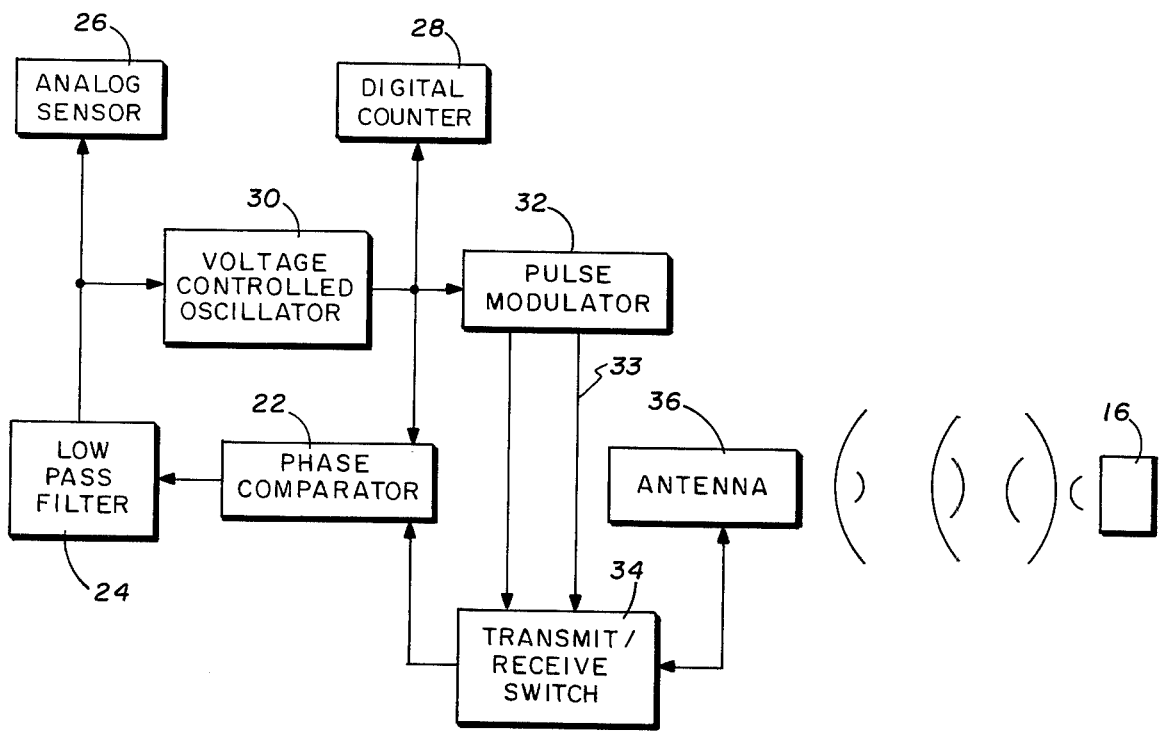
FIG. 2 is a block diagram of the present invention utilizing a pulsed transmitted signal.

A second embodiment of the present invention is shown in FIG. 2. A voltage controlled oscillator 30 produces an output signal which is conveyed to a pulse modulator 32 and to a phase comparator 22. The output of the pulse modulator 32 is passed through a transmit/receive switch 34 to an antenna 36 which functions as both a transmit and receive antenna. The pulse modulator 32 controls the operation of the transmit/receive switch 34 through a control line 33.

The reflected signal is captured by antenna 36 and passed through the transmit/receive switch 34 to an input to the phase comparator 22. The control voltage output of phase comparator 22 is passed through a low pass filter 24 to the control input of the voltage controlled oscillator 30 and to an analog sensor 26.

Referring to FIG. 2, the pulse modulator 32 acts as an on/off switch to create a pulse train from the continuous wave output of voltage controlled oscillator 30. The pulse modulator 32 also controls the transmit/receive switch 34 to connect the pulse modulator 32 to the antenna 36 when a pulse output is provided by pulse modulator 32. When there is no output from pulse modulator 32 the transmit/receive switch 34 connects antenna 36 to phase comparator 22.

Phase comparator 22 generates a control voltage proportional to the phase relationship of the voltage controlled oscillator 30 output and the reflected signal. This control voltage is passed through the low pass filter 24 to control the oscillation frequency of the voltage controlled oscillator 30. The voltage controlled oscillator 30 is driven to a frequency which produces a null output from the phase comparator 22. The time constant of the phase comparator 22 is sufficiently long so that it bridges the intervals when no pulse is being received.

The use of a pulsed transmit signal in the present invention provides a number of advantages. Since energy is being transmitted for only a small percentage of the time, the overall power consumption of the device is significantly reduced thus increasing the lifetime of battery-powered units. The pulses can also be utilized as in a conventional radar to determine range. In addition the pulses can be time-gated to screen out objects at particular ranges to increase detection sensitivity. For example, a strong return signal from a wall within a room can be time-blanked to prevent the system from locking on that one reflection. This makes the system more sensitive to weaker reflected signals which could be of primary interest.

Figure 3:
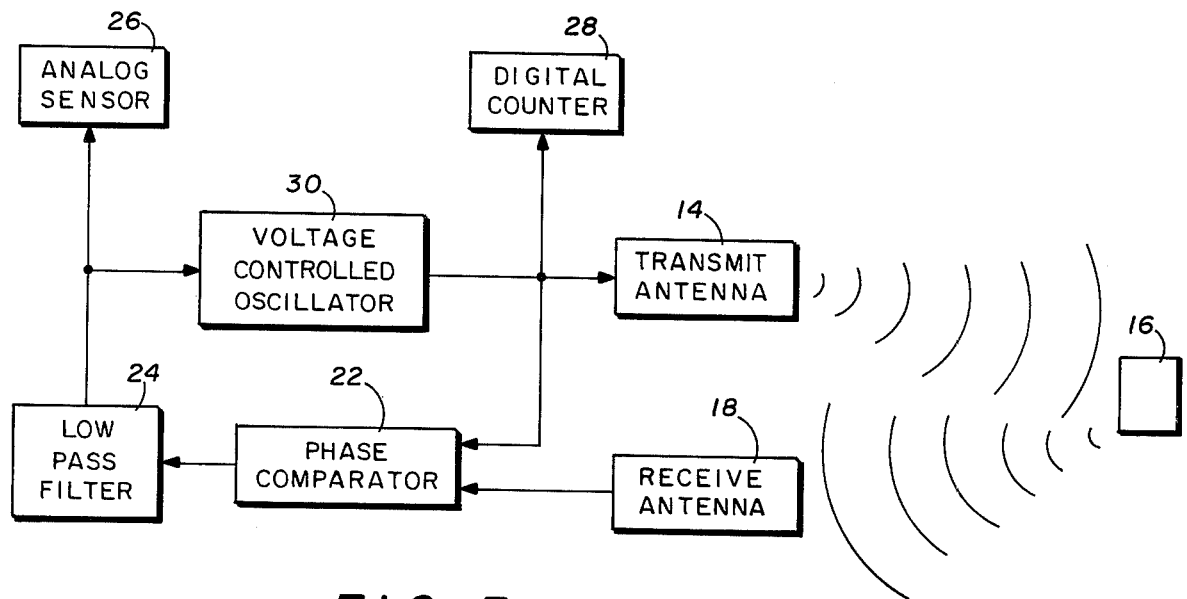
FIG. 3 is a block diagram of the present invention utilizing a variable frequency carrier.

An intrusion detection system in accordance with the present invention is shown in FIG. 3. A voltage controlled oscillator 30 provides a continuous wave signal to a transmit antenna 14, to one input to a phase comparator 22, and to a digital counter 28.

A receive antenna 18 captures the reflected signal from an object 16 and conveys the signal to one input of the phase comparator 22. The control voltage output of the phase comparator 22 is passed through a low pass filter 24 and provided to the control input of the voltage controlled oscillator 30 and to an analog sensor 26.

The phase comparator 22 generates a control signal which shifts the output frequency of the voltage controlled oscillator 30 until the travel path from transmit antenna 14 to the object 16 and back to receive antenna 18 is a multiple of the output frequency wave length or of a quarter wave length. Depending on the particular type of phase comparator 22, the travel path may optionally be a multiple or a quarter wave length multiple of the output frequency wave length.

When the position of the object 16 is changed, the length of the travel path is different and the output signal of the voltage controlled oscillator 30 must change frequency to regain lock. Thus there are two parameter variations which reveal a change in position of object 16. There is a variation in the control voltage output of the low pass filter 24, which is measured by analog sensor 26, and there is a change in the signal frequency of the output of voltage controlled oscillator 30 which is measured by the digital counter 28.

In actual operation the analog readout at sensor 26 or digital indication at counter 28 in a steady state condition are related to a particular arrangement of objects in the field of interest. In effect, there is a "signature" for a particular arrangement of a group of objects. Thus it is possible to measure the "signature" of a field at one time and compare it to the "signature" measured at a later time. For example, the "signature" of a vehicle storage yard could be measured days or weeks apart to determine not only if any vehicle is missing but also if the position of any vehicle has been changed and therefore probably used.

With this continuous wave embodiment in order to have a phase lock, there must always be a reflection signal provided to the phase comparator. Thus, it is necessary that the transmit and receive antennas operate against a reflection background of some type.

Figure 4:
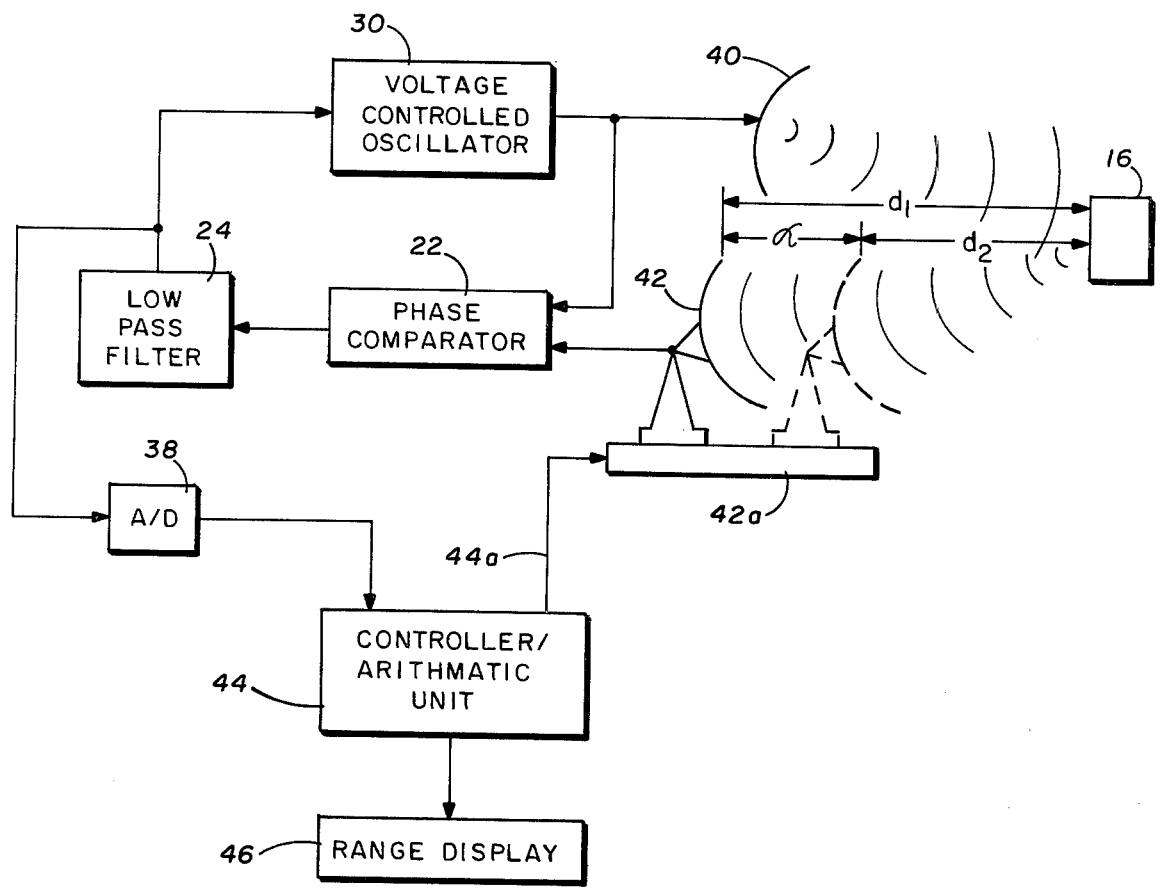
FIG. 4 is a block diagram of the present invention utilized in a range-finding system.

A further embodiment of the present invention is shown in FIG. 4. The output of the voltage controlled oscillator 30 is conveyed to a fixed transmit antenna 40 and to the phase comparator 22. The transmit signal is radiated by the fixed transmit antenna 40, reflected by the object 16 and captured by the variable position receive antenna 42. The reflected signal is then conveyed to the phase comparator 22 which produces a control voltage that is passed through the low pass filter 24. The control voltage is provided as a control input to the voltage controlled oscillator 30 and is the input to an analog-to-digital converter 38.

The digital output of the analog-to-digital converter 38 is provided to a controller/arithmetic unit 44 which has a control line 44a connected to the receive antenna base 42a. The controller/arithmetic unit 44 generates a range value which is provided to a range display 46.

The distance from the first position of the variable position receive antenna 42 (solid lines) to the object 16 is shown as $d_1$. The distance from the second position of the variable position receive antenna 42 (dotted lines) to the object 16 is $d_2$. The difference in the two antenna positions is $a$, which is a known value.

When the variable position receive antenna 42 is in the first position the system is phase locked to the object 16 with a frequency having a wave length $\lambda_1$. This process is the same as that described for the embodiment of FIG. 3. The receive antenna is then shifted to its second position and the system is phase locked with a new frequency having a wave length $\lambda_2$. The number of wave lengths "n" is the same in both positions since phase lock is maintained during the position transition. The position of the variable position antenna 42 is determined by the controller/arithmetic unit 44 through the control line 44a.

Thus the distances $d_1$, $d_2$ and $a$ and wave lengths $\lambda_1$, and $\lambda_2$ are related as follows:

$$d_1 - d_2 = a \tag{1}$$

$$d_1 = n\lambda_1 \tag{2}$$

$$d_2 = n\lambda_2 \tag{3}$$

$$n\lambda_1 - n\lambda_2 = a \tag{4}$$

$$n = \frac{a}{\lambda_1 - \lambda_2} \tag{5}$$

$$d_1 = \frac{a\lambda_1}{\lambda_1 - \lambda_2} \tag{6}$$

The output of the low pass filter 24 is a control voltage which is a function of the frequency of the output of the voltage controlled oscillator 30. This control voltage is digitized in the analog-to-digital converter 38 and is an input to the controller/arithmetic unit 44. The center frequency of the voltage controlled oscillator 30 and the functional relationship of the control voltage and output frequency are stored in the controller/arithmetic unit 44 which calculates the output frequency of the voltage controlled oscillator 30.

When it is determined to measure the range to the object 16, the controller/arithmetic unit 44 calculates and records the output frequency of the voltage oscillator 30. The controller/arithmetic unit 44 then commands the receiver base 42a to shift the receive antenna to the second position. The new output frequency of the voltage controlled oscillator 30 is then measured and recorded. The controller/arithmetic unit 44 converts these frequencies to wave length, and uses these values to solve equation (6) for the range $d_1$ to the object 16. This range value is then output to the range display unit 46.

The preferred embodiment of the controller/arithmetic unit 44 is a microprocessor model 8080A manufactured by Intel Corp. The programming and operation of this microprocessor is described in 8080 Microcomputer System User's Manual published by Intel Corp. Further description of the use of microprocessors is given in *Microprocessors* by Lawrence Altman, McGraw-Hill, copyright 1975.

The target distance can be determined using the technique described in FIG. 4 with any system which establishes two different propagation path distances. Other methods for accomplishing this include moving the transmit antenna or utilizing multiple fixed transmit or receive antennas. This can also be accomplished with the use of an electronic delay line.

This range-finding technique can also be used in the embodiments shown in FIGS. 1, 2 and 3.

It should be noted that it is possible to implement the present invention in either a sonic or electromagnetic detection system.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. Apparatus for detecting a change in position of an object in a field comprising:
   a variable frequency transmitter for generating a transmit signal toward the object;
   a receiver for receiving a reflection signal of said transmit signal from the object;
   phase comparator means connected to receive said reflection signal and said transmit signal for generating an output signal applied to said variable frequency transmitter to control the frequency of said variable frequency transmitter to thereby maintain a predetermined phase relationship between said transmit signal and said reflection signal, such that the frequency of said transmit signal depends on the distance between the object and said variable frequency transmitter; and
   means connected to said phase comparator means for continuously monitoring said output signal to provide an indication of a change in position of the object in the field.

2. The apparatus of claim 1 and further including means connected to said variable frequency transmitter for continuously monitoring the frequency of said variable frequency transmitter.

3. The apparatus of claim 1 and further including a low pass filter connected to receive said output signal generated by said phase comparator means to provide an input to said variable frequency transmitter.

4. The apparatus of claim 1 wherein said transmitter includes an oscillator for generating a continuous wave.

5. The apparatus of claim 1 wherein said transmitter includes an oscillator and means for controlling said oscillator to generate a pulsed transmit signal.

6. Apparatus for detecting a change in position of an object in a field comprising:
- a transmitter for generating a transmit signal toward the object;
- a variable frequency oscillator for generating a modulation signal;
- means for modulating said transmit signal with said modulation signal to generate a modulated transmit signal;
- a receiver for receiving a reflection signal of said modulated transmit signal from the object;
- means for demodulating said reflection signal to generate a demodulated reflection signal;
- phase comparator means connected to receive said demodulated reflection signal and said modulation signal for generating an output signal applied to said variable frequency oscillator to control the frequency of said modulation signal to thereby maintain a predetermined phase relationship between said modulation signal and said demodulated reflection signal, such that the frequency of said modulation signal depends on the distance between the object and said transmitter; and
- means connected to said phase comparator means for continuously monitoring said output signal to provide an indication of a change in position of the object in the field.

7. The apparatus of claim 6 and further including means connected to said variable frequency oscillator for continuously monitoring said modulation signal.

8. A range finder for determining the range to an object comprising:
- a variable frequency transmitter for generating a transmit signal toward the object;
- a receiver for receiving a reflection signal at a first and second position of said transmit signal from the object, the distance between said first and second positions differing by a predetermined distance;
- phase comparator means connected to receive said reflection signal and said transmit signal for generating an output applied to said variable frequency transmitter to control the frequency of said variable frequency transmitter to thereby maintain a predetermined phase relationship between said transmit signal and said reflection signal when said receiver is located at said first and second positions;
- means for moving said receiver between said first and second positions;
- means for calculating a difference frequency, being the difference between said transmit frequency generated by said variable frequency transmitter when said receiver is in said first position and when said receiver is in said second position;
- means for determining the range to the object by calculating a ratio between said transmit frequency generated by said variable frequency transmitter when said receiver is in said first position increased by a factor of said predetermined distance between said first and second positions and said difference frequency; and
- means for displaying the calculated range to the object.

9. The range finder of claim 8 wherein said transmitter includes an oscillator for generating a continuous wave.

10. The range finder of claim 8 wherein said transmitter includes an oscillator and means for controlling said oscillator to generate a pulsed transmit signal.

11. A method for detecting position changes of an object in a field comprising the steps of:
- generating a transmit signal at a transmitting station toward the object;
- receiving a reflection signal of said transmit signal from the object;
- controlling the frequency of said transmit signal to maintain a predetermined phase relationship between said transmit signal and said reflection signal such that the frequency of said transmit signal depends on the distance between the object and said transmitting station; and
- continuously monitoring the frequency of said transmit signal to provide an indication of a change in position of the object in the field.

12. The method of claim 11 including the step of continuously monitoring the frequency of said transmit signal.

13. A method for measuring the range to an object comprising the steps of:
- generating a transmit signal;
- receiving at a first location a reflection signal of said transmit signal from the object;
- varying the frequency of said transmit signal to produce a first frequency having a predetermined phase relationship between said transmit signal and said reflection signal;
- receiving at a second location, being a predetermined distance from said first location, said reflection signal of said transmit signal from the object;
- varying the frequency of said transmit signal to produce a second frequency having said predetermined phase relationship between said transmit signal and said reflection signal;
- determining the range to the object by using the relationship $$d = \frac{(a) \lambda_1}{|\lambda_1 - \lambda_2|}$$

where:
- $d$ is the range to the object;
- $a$ is said predetermined distance between said first location and said second location;
- $\lambda_1$ is the wavelength of said first frequency; and
- $\lambda_2$ is the wavelength of said second frequency; and
- continuously displaying the range to the object.

* * * * *